US010090705B2

(12) United States Patent
Maeda et al.

(10) Patent No.: US 10,090,705 B2
(45) Date of Patent: Oct. 2, 2018

(54) PLANT FACILITIES TESTING APPARATUS

(71) Applicant: Mitsubishi Electric Corporation, Chiyoda-ku, Tokyo (JP)

(72) Inventors: Natsuko Maeda, Tokyo (JP); Shinichiro Tsudaka, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 349 days.

(21) Appl. No.: 14/784,777

(22) PCT Filed: Jul. 11, 2013

(86) PCT No.: PCT/JP2013/068980
§ 371 (c)(1),
(2) Date: Oct. 15, 2015

(87) PCT Pub. No.: WO2015/004771
PCT Pub. Date: Jan. 15, 2015

(65) Prior Publication Data
US 2016/0079808 A1   Mar. 17, 2016

(51) Int. Cl.
H02J 13/00 (2006.01)
G05B 23/02 (2006.01)

(52) U.S. Cl.
CPC .......... *H02J 13/00* (2013.01); *G05B 23/0267* (2013.01); *H02J 13/001* (2013.01);
(Continued)

(58) Field of Classification Search
CPC .... G05B 23/0267; H02J 13/00; H02J 13/001; Y02E 60/74; Y04S 10/30; Y04S 10/40; Y04S 10/522
See application file for complete search history.

(56) References Cited

U.S. PATENT DOCUMENTS 6,108,616 A * 8/2000 Borchers ............ G05B 23/0213
   700/286
6,167,401 A * 12/2000 Csipkes ............ G05B 19/41805
(Continued)

FOREIGN PATENT DOCUMENTS

JP   09-330248 A   12/1997
JP   11-175370 A    7/1999
(Continued)

OTHER PUBLICATIONS

International Search Report (PCT/ISA/210) dated Aug. 6, 2013, by the Japanese Patent Office as the International Searching Authority for International Application No. PCT/JP2013/068980.

*Primary Examiner* — Kenneth M Lo
*Assistant Examiner* — Chad Erdman
(74) *Attorney, Agent, or Firm* — Buchanan Ingersoll & Rooney PC

(57) ABSTRACT

A control unit of a plant facilities testing apparatus implements a first step of obtaining unupdated screen information and updated screen information, a second step of obtaining an unupdated test-item table file, a third step of comparing the unupdated screen information with the updated screen information and extracting a change item and an addition item while categorizing a difference thereinto, a fourth step of creating a test-item table file for an addition portion based on the addition item, a fifth step of creating a test-item table file for a change portion based on the change item and the unupdated test-item table file, and a sixth step of creating an updated test-item table file by combining the test-item table file for an addition portion with the test-item table file for a change portion.

17 Claims, 14 Drawing Sheets

(52) U.S. Cl.
CPC ............... *Y02E 60/74* (2013.01); *Y04S 10/30* (2013.01); *Y04S 10/40* (2013.01); *Y04S 10/522* (2013.01)

(56) References Cited

U.S. PATENT DOCUMENTS

| | | | | |
|---|---|---|---|---|
| 6,768,970 | B2 * | 7/2004 | Shimizu | G05B 23/0256 376/215 |
| 2002/0161777 | A1 * | 10/2002 | Smialek | G06F 8/10 |
| 2002/0194225 | A1 * | 12/2002 | Karaila | G05B 19/4184 715/234 |
| 2003/0097288 | A1 * | 5/2003 | Shimomura | G06Q 10/06 705/7.18 |
| 2003/0195904 | A1 * | 10/2003 | Chestnut | G06F 21/6227 |
| 2008/0310736 | A1 * | 12/2008 | Chattopadhyay | G06F 11/3692 382/218 |
| 2008/0313006 | A1 * | 12/2008 | Witter | G06Q 10/063118 705/7.17 |
| 2010/0080334 | A1 * | 4/2010 | Sohn | G21C 7/36 376/217 |
| 2010/0131522 | A1 * | 5/2010 | Dam | G06Q 50/04 707/756 |
| 2011/0083092 | A1 * | 4/2011 | Ito | G05B 19/4063 715/771 |
| 2012/0136608 | A1 | 5/2012 | Yoshinaga et al. | |

FOREIGN PATENT DOCUMENTS

| | | | |
|---|---|---|---|
| JP | 2007-334745 | | 12/2007 |
| JP | 2008-176664 A | | 7/2008 |
| JP | 2012-113538 A | | 6/2012 |
| JP | 2012226683 A | * | 11/2012 |
| JP | 2013-097640 A | | 5/2013 |

\* cited by examiner

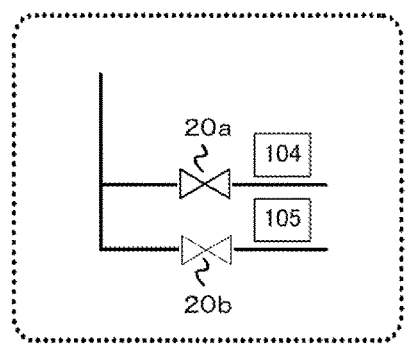

Figure 3

| Screen No.104 | Signal number | Setting value | Valve symbol | — |
|---|---|---|---|---|
| 1 | Signal number 1 | 1 | Full open | |
| | Signal number 2 | 0 | | |
| 2 | Signal number 1 | 1 | Middle | |
| | Signal number 2 | 1 | | |
| 3 | Signal number 1 | 0 | Full close | |
| | Signal number 2 | 1 | | |
| 4 | Signal number 1 | 0 | Blank | |
| | Signal number 2 | 0 | | |
| Screen No.105 | Signal number | Setting value | Valve symbol | — |
| 1 | Signal number 3 | 1 | Full open | |
| | Signal number 4 | 0 | | |
| 2 | Signal number 3 | 1 | Middle | |
| | Signal number 4 | 1 | | |
| 3 | Signal number 3 | 0 | Full close | |
| | Signal number 4 | 1 | | |
| 4 | Signal number 3 | 0 | Blank | |
| | Signal number 4 | 0 | | |

Figure 4

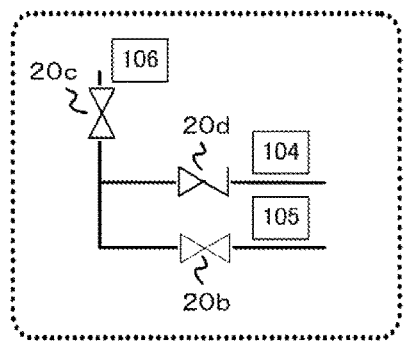

Figure 5

| Screen No.104 | Signal number | Setting value | Valve symbol | — |
|---|---|---|---|---|
| 1 | Signal number 5 | 1 | Full open ▷◁ | |
| | Signal number 6 | 0 | | |
| 2 | Signal number 5 | 1 | Middle ▶◁ | |
| | Signal number 6 | 1 | | |
| 3 | Signal number 5 | 0 | Full close ▶◀ | |
| | Signal number 6 | 1 | | |
| 4 | Signal number 5 | 0 | Blank | |
| | Signal number 6 | 0 | | |

Figure 6

| Screen No.106 | Signal number | Setting value | Valve symbol | — |
|---|---|---|---|---|
| 1 | Signal number 7 | 1 | Full open ▷◁ | |
| | Signal number 8 | 0 | | |
| 2 | Signal number 7 | 1 | Middle ▷◀ | |
| | Signal number 8 | 1 | | |
| 3 | Signal number 7 | 0 | Full close ▶◀ | |
| | Signal number 8 | 1 | | |
| 4 | Signal number 7 | 0 | Blank | |
| | Signal number 8 | 0 | | |

Figure 7

| Screen No.104 | Signal number | Setting value | Valve symbol | – |
|---|---|---|---|---|
| 1 | Signal number 5 | 1 | Full open ▷◁ | |
|   | Signal number 6 | 0 | | |
| 2 | Signal number 5 | 1 | Middle ▶◁ | |
|   | Signal number 6 | 1 | | |
| 3 | Signal number 5 | 0 | Full close ▶◀ | |
|   | Signal number 6 | 1 | | |
| 4 | Signal number 5 | 0 | Blank | |
|   | Signal number 6 | 0 | | |
| Screen No.105 | Signal number | Setting value | Valve symbol | – |
| 1 | Signal number 3 | 1 | Full open ▷◁ | |
|   | Signal number 4 | 0 | | |
| 2 | Signal number 3 | 1 | Middle ▷◀ | |
|   | Signal number 4 | 1 | | |
| 3 | Signal number 3 | 0 | Full close ▶◀ | |
|   | Signal number 4 | 1 | | |
| 4 | Signal number 3 | 0 | Blank | |
|   | Signal number 4 | 0 | | |
| Screen No.106 | Signal number | Setting value | Valve symbol | – |
| 1 | Signal number 7 | 1 | Full open ▷◁ | |
|   | Signal number 8 | 0 | | |
| 2 | Signal number 7 | 1 | Middle ▷◀ | |
|   | Signal number 8 | 1 | | |
| 3 | Signal number 7 | 0 | Full close ▶◀ | |
|   | Signal number 8 | 1 | | |
| 4 | Signal number 7 | 0 | Blank | |
|   | Signal number 8 | 0 | | |

Figure 8

| Screen No.104 | Signal number | Setting value | Valve symbol | — |
|---|---|---|---|---|
| 1 | Signal number 5 | 1 | Full open | |
| | Signal number 6 | 0 | | |
| 2 | Signal number 5 | 1 | Middle | |
| | Signal number 6 | 1 | | |
| 3 | Signal number 5 | 0 | Full close | |
| | Signal number 6 | 1 | | |
| 4 | Signal number 5 | 0 | Blank | |
| | Signal number 6 | 0 | | |

Figure 15

| Screen No.106 | Signal number | Setting value | Valve symbol | — |
|---|---|---|---|---|
| 1 | Signal number 7 | 1 | Full open | |
| | Signal number 8 | 0 | | |
| 2 | Signal number 7 | 1 | Middle | |
| | Signal number 8 | 1 | | |
| 3 | Signal number 7 | 0 | Full close | |
| | Signal number 8 | 1 | | |
| 4 | Signal number 7 | 0 | Blank | |
| | Signal number 8 | 0 | | |

Figure 16

PLANT FACILITIES TESTING APPARATUS

TECHNICAL FIELD

The present invention relates to a plant facilities testing apparatus and particularly to an apparatus that automatically creates a test-item table file to be utilized in testing a control program for a power station.

BACKGROUND ART

In a power station such as a nuclear power station, monitoring and controlling of the plant facilities are implemented by use of a monitoring operation screen. In the monitoring operation screen, a GUI (Graphic User Interface) control program is working. Test of the GUI control program is implemented by use of a table file in which test items are listed. The test-item table file is updated when a design change or a design addition occurs in the plant facilities. The present invention relates to an apparatus that automatically creates a test-item table file for a GUI control program to be utilized in a monitoring operation screen for a power station.

A GUI control program is to create a dialogue screen and includes GUI components such as a menu and a button and an event for notifying that when a GUI component is operated through an input device such as a mouse or a key board, the operation has occurred. In an apparatus that automatically creates a test-item table file for a GUI control program, an apparatus that reads screen information and automatically creates a test-item table file is known (for example, refer to Patent Documents 1, 2, and 3). In the foregoing apparatus, when screen data is changed or something is added thereto, the part changed or added is automatically extracted based on the screen data and the test-item table file at a time before the change or addition has been carried out.

With a monitoring operation screen to be utilized in a nuclear power station, a tester manually creates a test-item table file and visually ascertains the monitoring operation screen. Each time a design change and a design addition are frequently implemented, the tester repeats manual application of the change and the addition to the corresponding parts and visual ascertainment thereof. This work takes a long time; on top of that, in any of the working processes, there occurs a human error such as a change omission, an addition omission, a change mistake, an addition mistake, an ascertainment omission, or an ascertainment mistake. In an oversea nuclear plant item, user maintenance is required. When a customer applies a change or an addition to the test-item table file, it is required to secure the quality the same as that in the factory.

PRIOR ART REFERENCE

Patent Document

[Patent Document 1] Japanese Patent Application Laid-Open No. H9-330248
[Patent Document 2] Japanese Patent Application Laid-Open No. H11-175370
[Patent Document 3] Japanese Patent Application Laid-Open No. 2007-334745

DISCLOSURE OF THE INVENTION

Problems to be Solved by the Invention

The present invention has been implemented in order to solve the foregoing problems; the objective thereof is that when a specification change and a specification addition occurs in a monitoring operation screen, a new test-item table file is automatically created from previous screen information and a previous test-item table file at a time before the design change and the design addition have been implemented and from new screen information at a time after the design change and the design addition have been implemented so that the time for creating a test-item table file is shortened.

Means for Solving the Problems

A plant facilities testing apparatus according to the present invention includes a display device that displays a monitoring operation screen for plant facilities installed in a power station, a first table file storage device that stores an unupdated test-item table file for the plant facilities, a first table file storage device that stores an unupdated test-item table file for the plant facilities, a first screen data storage device that stores an unupdated screen information on a monitoring operation screen to be displayed by the display device, a first screen data storage device that stores an unupdated screen information on a monitoring operation screen to be displayed by the display device, and a control unit that controls the first table file storage device, the second table file storage device, the first screen data storage device, and the second screen data storage device.

When update of the test-item table file is started, the control unit implements:
 a first step of obtaining the unupdated screen information and the updated screen information from the first screen data storage device and the second screen data storage device, respectively;
 a second step of obtaining the unupdated test-item table file from the first table file storage device;
 a third step of comparing the unupdated screen information and the updated screen information that have been obtained in the first step and extracting a change item and an addition item while categorizing a difference thereinto;
 a fourth step of creating a test-item table file for an addition portion, based on the addition item extracted in the third step;
 a fifth step of creating a test-item table file for a change portion, based on the change item extracted in the third step and the unupdated test-item table file obtained in the second step;
 a sixth step of creating an updated test-item table file by combining the test-item table file for an addition portion created in the fourth step with the test-item table file for a change portion created in the fifth step; and
 a seventh step of storing the updated test-item table file created in the sixth step in the second table file storage device.

Advantage of the Invention

The present invention demonstrates effects stated as follows. When a specification change and a specification addition occurs in a monitoring operation screen, a new test-item table file is automatically created from previous screen information and a previous test-item table file at a time before the design change and the design addition have been implemented and from new screen information at a time after the design change and the design addition have been implemented, so that the time for creating a test-item table file can be shortened. Moreover, a human error such as a change error or a change omission can be prevented.

BRIEF DESCRIPTION OF THE DRAWINGS

FIG. 3 is a view illustrating part of a monitoring operation screen when extracted therefrom;

FIG. 4 is a view illustrating an example of previous test-item table file;

FIG. 5 is a view illustrating part of a monitoring operation screen when an addition and a change have occurred therein;

FIG. 6 is a view illustrating part of a test-item table file regarding changed items;

FIG. 7 is a view illustrating part of a test-item table file regarding added items;

FIG. 8 is a view illustrating a new test-item table file created taking a change and an addition into consideration;

FIG. 15 is a view illustrating an example of test-item table file in which a fact that a monitoring operation screen has been changed is expressed by coloring the screen;

FIG. 16 is a view illustrating an example of test-item table file in which a fact that something has been added to a monitoring operation screen is expressed by coloring the screen;

BEST MODE FOR CARRYING OUT THE INVENTION

Figure 1:
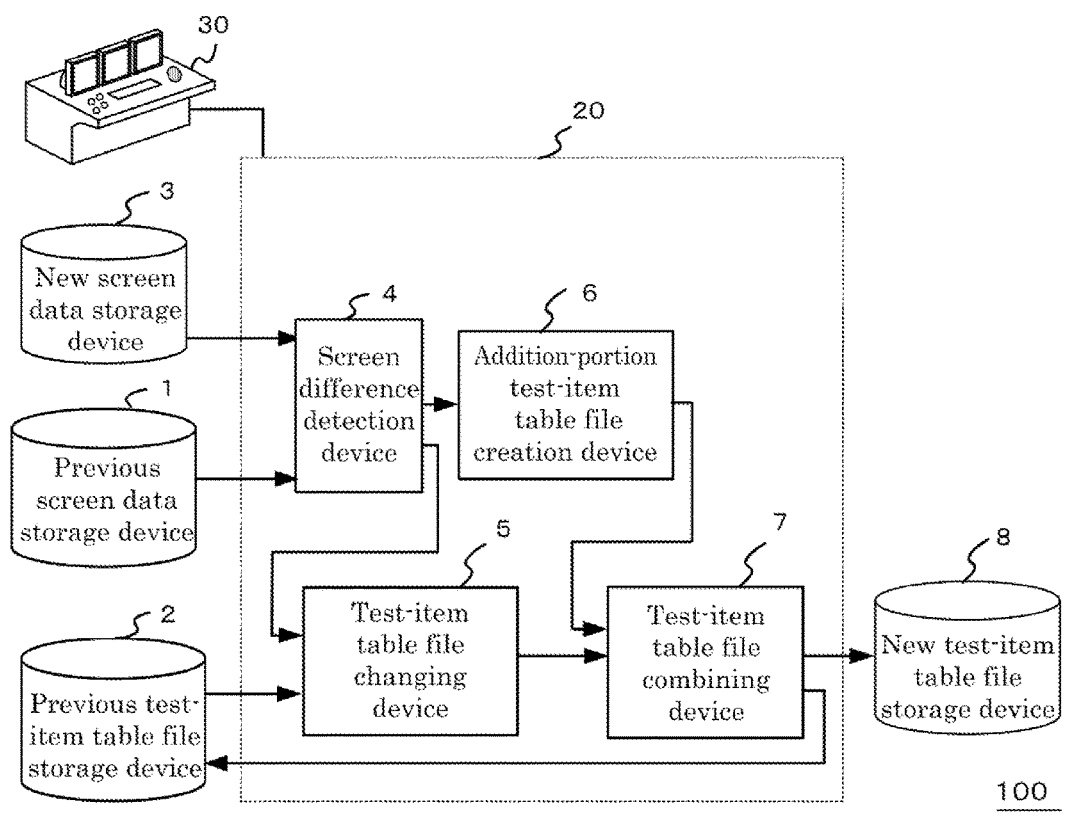
FIG. 1 is a diagram illustrating the configuration of a plant facilities testing apparatus according to Embodiment 1 of the present invention.

Hereinafter, Embodiments of a plant facilities testing apparatus according to the present invention will be explained in detail with reference to the drawings. The present invention is not limited to the following descriptions but can appropriately be modified within a scope that does not deviate from its spirits. In the drawings, the constituent elements with the same reference characters denote the same or equivalent constituent elements.

Embodiment 1

In a nuclear power station, a monitoring operation screen is utilized for monitoring and controlling the plant facilities. In the monitoring operation screen, a test-item table file to be utilized in testing a GUI (Graphic User Interface) control program is created. When a design change and a design addition occur in a test-item table file, a plant facilities testing apparatus according to the present invention extracts only the test items that require the change and the addition, based on screen information at a time before the change and the addition are implemented and information on the test-item table file, and then automatically creates a new test-item table file.

Embodiment 1 of the present invention will be explained below with reference to FIG. 1. A plant facilities testing apparatus 100 includes a previous screen data storage device 1, a previous test-item table file storage device 2, a new screen data storage device 3, a new test-item table file storage device 8, a control unit 20, a display device 30, and the like. The control unit 20 has a screen difference detection device 4, a test-item table file changing device 5, an addition-portion test-item table file creation device 6, and a test-item table file combining device 7. The display device 30 displays a monitoring operation screen for plant facilities installed in a power station.

Next, the operation will be explained. The previous screen data storage device 1 stores previous screen information (data) at a time before a design change and a design addition are implemented. The previous test-item table file storage device 2 stores a test-item table file at a time before a design change and a design addition are implemented; the test-item table file corresponds to the previous screen information. The new screen data storage device 3 stores new screen information (data) at a time after the design change and the design addition have been implemented. The screen difference detection device 4 compares the previous screen information obtained from the previous screen data storage device 1 with the new screen information obtained from the new screen data storage device 3 and then extracts the difference between the previous screen information and the new screen information while categorizing the difference into a screen change item and a screen addition item. With regard to the screen change item and the screen addition item extracted by the screen difference detection device 4, the test-item table file changing device 5 reads and changes the previous test-item table file stored in the previous test-item table file storage device 2.

The addition-portion test-item table file creation device 6 creates a test-item table file for the addition portion extracted by the screen difference detection device 4. The test-item table file combining device 7 combines the test-item table files to which the change and the addition have been applied by the test-item table file changing device 5 and the addition-portion test-item table file creation device 6, respectively. The new test-item table file storage device 8 stores the output of the test-item table file combining device 7. In Embodiment 1, the screen difference detection device 4 extracts a change portion and an addition portion, and a test-item table file for the change portion and a test-item table file for the addition portion are separately created by the test-item table file changing device 5 and the addition-portion test-item table file creation device 6, respectively; therefore, a new test-item table file can efficiently be created.

Figure 2:
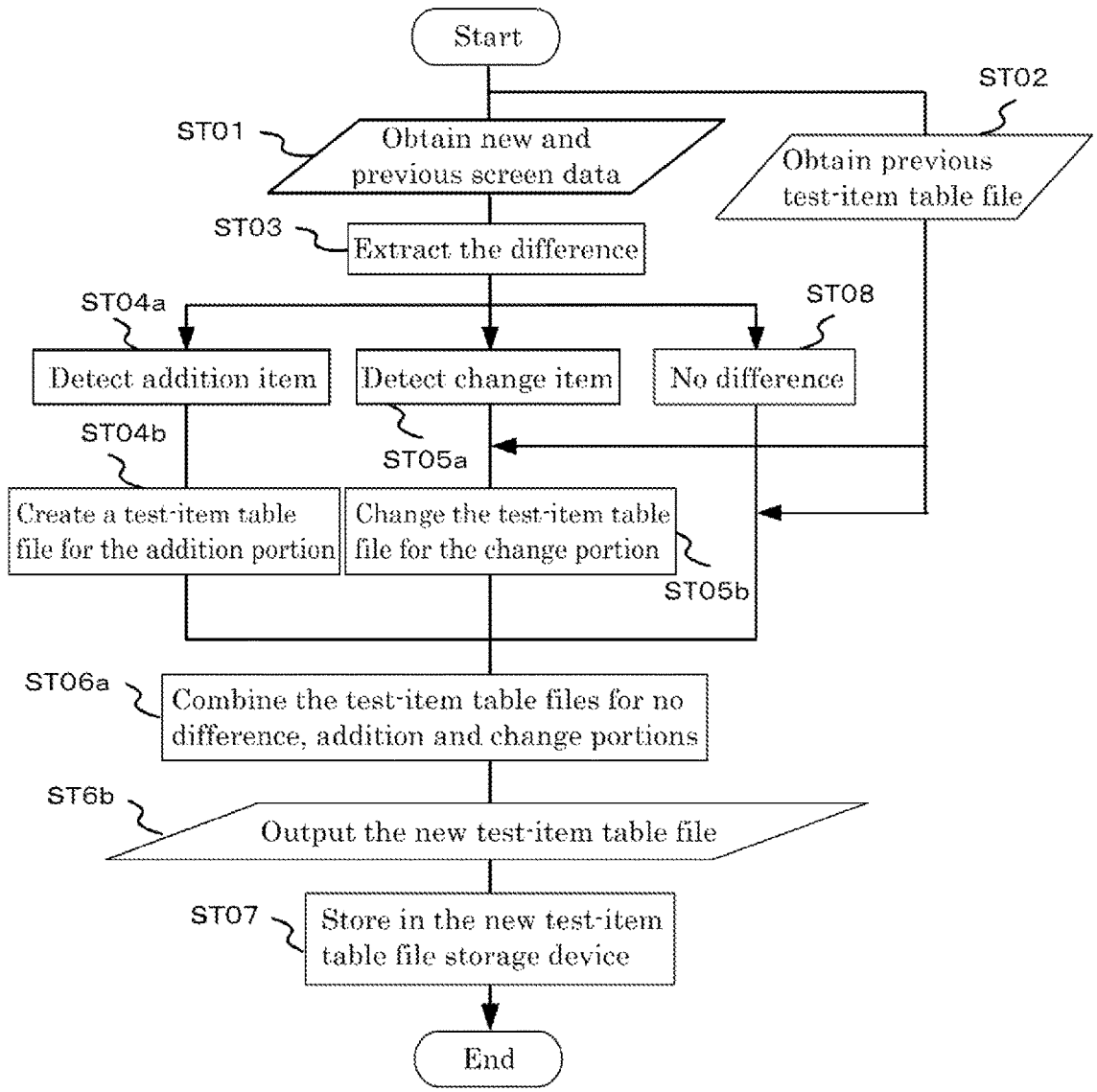
FIG. 2 is a chart representing the flow of creating a test-item table file according to Embodiment 1 of the present invention.

Next, the creation procedure for a test-item table file will be explained with reference to the flowchart in FIG. 2. Previous screen information at a time before a design change and a design addition are implemented is stored in the previous screen data storage device 1. Previous test-item table file at a time before a design change and a design addition are implemented is stored in the previous test-item table file storage device 2. New screen information at a time after a design change and a design addition have been implemented is stored in the new screen data storage device 3. When creation of a new test-item table file is started, the screen difference detection device 4 obtains the previous screen information and the new screen information from the previous screen data storage device 1 and the new screen data storage device 3, respectively (ST01). The test-item table file changing device 5 obtains the previous test-item table file from the previous test-item table file storage device 2 (ST02). The screen difference detection device 4 compares the obtained previous screen information with the obtained new screen information and then extracts a change item (or change portion) and an addition item (or addition portion) of the monitoring operation screen (ST03).

When detecting the addition item extracted by the screen difference detection device 4 (ST04*a*), the addition-portion test-item table file creation device 6 creates a test-item table file for the addition portion (ST04*b*). When detecting the change item extracted by the screen difference detection device 4 (ST05*a*), the test-item table file changing device 5 reads and changes the previous test-item table file stored in the previous test-item table file storage device 2 and then creates a test-item table file for the change portion (ST05*b*). The test-item table file combining device 7 combines the test-item table file created by the test-item table file changing device 5 with the test-item table file created by the addition-portion test-item table file creation device 6 so as to create a new test-item table file (ST06*a*), and then outputs the created new test-item table file (ST06*b*). The new test-item table file storage device 8 stores the new test-item table file outputted by the test-item table file combining device 7 (ST07).

When the previous test-item table file has not been changed, i.e., when the screen difference detection device 4 detects either addition item nor change item, the test-item table file changing device 5 transfers the previous test-item table file to the next step (ST08). When combining the test-item table file created by the test-item table file changing device 5 with the test-item table file created by the addition-portion test-item table file creation device 6 (ST06*a*), the test-item table file combining device 7 outputs the previous test-item table file as a new test-item table file (ST06*b*). In Embodiment 1, the screen difference detection device 4 extracts a change portion and an addition portion, and a test-item table file for the change portion and a test-item table file for the addition portion are separately created by the test-item table file changing device 5 and the addition-portion test-item table file creation device 6, respectively; therefore, a new test-item table file can efficiently be created.

The foregoing operation will specifically be explained with reference to FIGS. 3 through 8. FIG. 3 illustrates an example of monitoring operation screen, obtained by extracting part of an unupdated monitoring operation screen displayed on the display device 30. In the monitoring operation screen displaying a pipe portion, two main steam valves are drawn. The opening/closing state of a main steam valve 20*a* is managed with a screen number 104. Similarly, the opening/closing state of a main steam valve 20*b* is managed with a screen number 105. The unupdated screen information including, for example, information items on input signals and the display positions of inspection products displayed on this screen is stored in the previous screen data storage device 1.

FIG. 4 represents a test-item table file corresponding to the monitoring operation screen illustrated in FIG. 3. In this test-item table file, each of signal numbers 1 through 4 and a setting value (1 or 0) are combined so that the opening/closing states of the two main steam valves are expressed. The opening/closing state of the main steam valve 20*a* is controlled by the respective magnitudes of the setting values designated as the signal numbers 1 and 2. Similarly, the opening/closing state of the main steam valve 20*b* is controlled by the respective magnitudes of the setting values designated as the signal numbers 3 and 4. The setting values (1, 0) suggest that the main steam valve is fully opened. The setting values (1, 1) suggest that the main steam valve is half opened. The setting values (0, 1) suggest that the main steam valve is fully closed. The setting values (0, 0) suggest that the state of the main steam valve is blank. FIG. 4 corresponds to a previous test-item table file.

FIG. 5 illustrates an example of monitoring operation screen, obtained by extracting part of a monitoring operation screen at a time after a design change and a design addition have been applied to the pipe portion. A main steam valve 20*c* is added to the monitoring operation screen displaying the pipe portion. Moreover the main steam valve 20*a* is replaced by a check valve 20*d*. The state of the added main steam valve 20*c* is managed with a screen number 106. As is the case with the main steam valve 20*a*, the state of the check valve 20*d* is managed with the screen number 104. The screen information including information items on input signals and the display positions of inspection products displayed on this screen is stored in the new screen data storage device 3.

FIG. 6 represents a test-item table file corresponding to the change items in the monitoring operation screen illustrated in FIG. 5. In this test-item table file, each of signal numbers 5 through 6 and a setting value (1 or 0) are combined so that the opening/closing state of the check valve 20*d* is expressed. The setting values (1, 0) suggest that the check valve 20*d* is fully opened; the setting values (1, 1) suggest that the check valve 20*d* is half opened; the setting values (0, 1) suggest that the check valve 20*d* is fully closed. The setting values (0, 0) suggest that the state of the check valve 20*d* is blank. The screen difference detection device 4 extracts the difference and the test-item table file changing device 5 creates a test-item table file for the change portion.

FIG. 7 represents a test-item table file corresponding to the addition items in the monitoring operation screen illustrated in FIG. 5. In this test-item table file, each of signal numbers 7 through 8 and a setting value (1 or 0) are combined so that the opening/closing state of the main steam valve 20*c* is expressed. The setting values (1, 0) suggest that the main steam valve 20*c* is fully opened; the setting values (1, 1) suggest that the main steam valve 20*c* is half opened; the setting values (0, 1) suggest that the main steam valve 20*c* is fully closed. The setting values (0, 0) suggest that the state of the main steam valve 20*c* is blank. The screen difference detection device 4 extracts the difference and the addition-portion test-item table file creation device 6 creates a test-item table file for the addition portion.

FIG. 8 represents a new test-item table file, in the monitoring operation screen, that is created by adding the design change and the design addition to a previous test-item table file. The test-item table file combining device 7 combines FIGS. 4, 6, and 7, so that a new test-item table file represented in FIG. 8 is created. This is an updated test-item table file corresponding to FIG. 5 and is stored in the new test-item table file storage device 8.

The plant facilities testing apparatus 100 according to Embodiment 1 makes it possible to efficiently create a test-item table file for a screen with a different assignment number or a screen created by adding information to a previous screen. Moreover, the plant facilities testing apparatus 100 makes it possible to realize maintenance work by a user, which is required in an oversea nuclear power plant, so that a customer can also readily secure the quality that is at a level the same as that of the factory.

Embodiment 2

Figure 9:
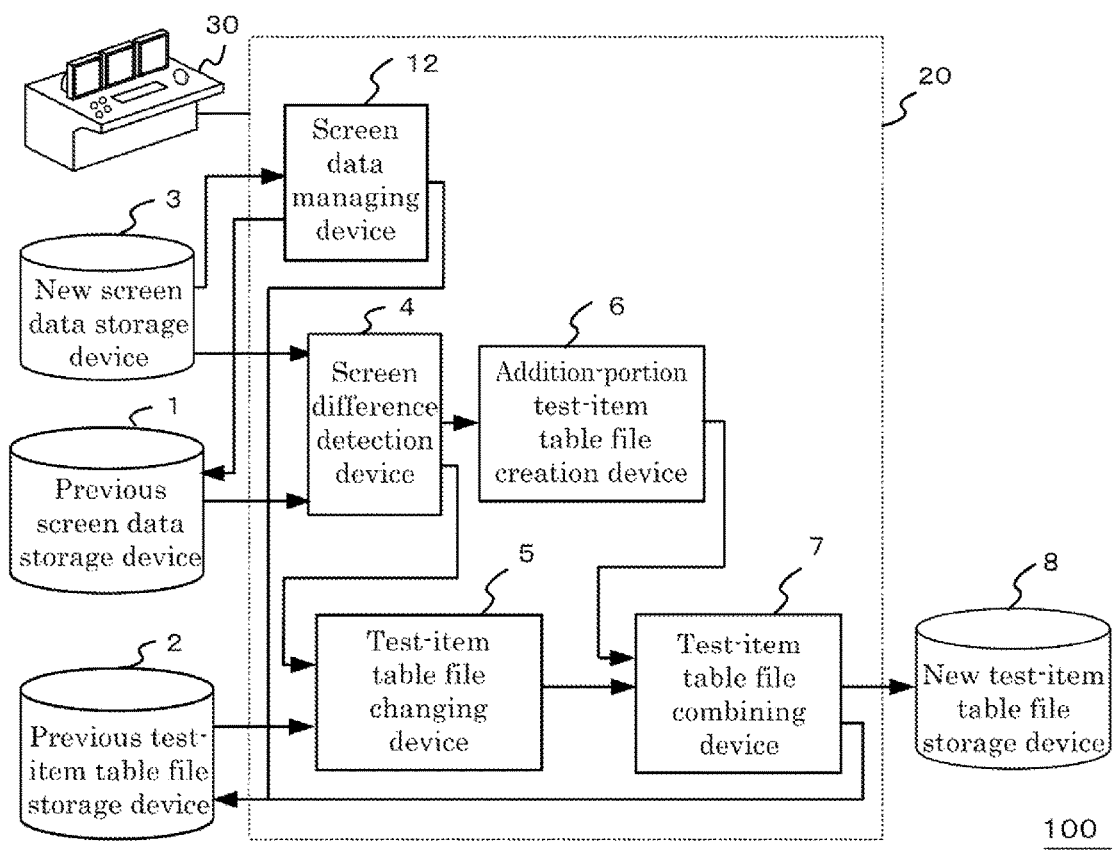
FIG. 9 is a diagram illustrating the configuration of a plant facilities testing apparatus according to Embodiment 2 of the present invention.
Figure 10:
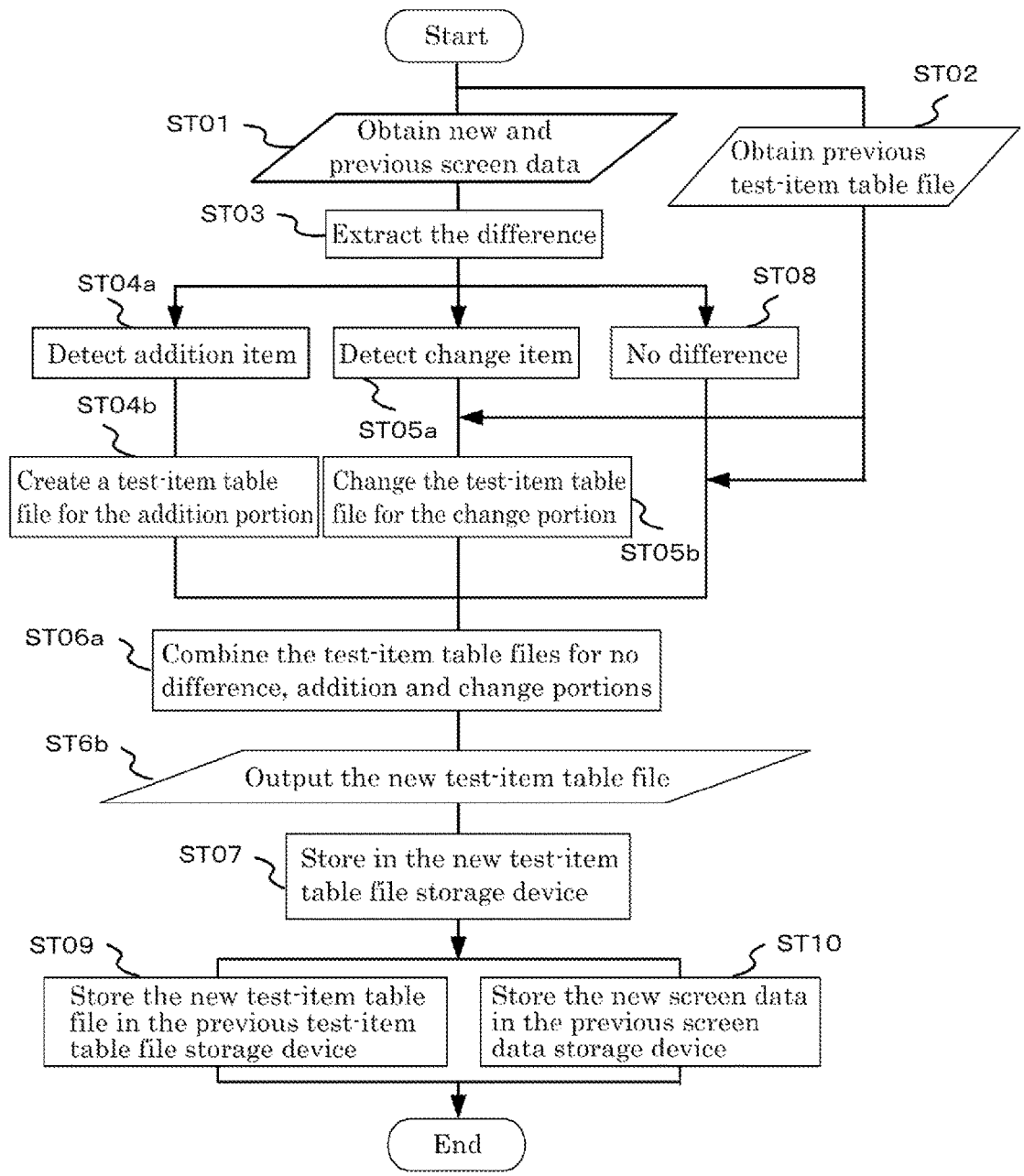
FIG. 10 is a chart representing the flow of creating a test-item table file according to Embodiment 2 of the present invention.

In Embodiment 1, it has been described that the screen difference detection device 4 extracts portions in a monitoring operation screen, in which a design change and a design addition are implemented and then the change and the addition are performed based on information in the previous test-item table file, so that the creation time is shortened. FIG. 9 is a diagram illustrating the configuration of a plant facilities testing apparatus according to Embodiment 2 of the present invention. A screen data managing device 12 is added to the plant facilities testing apparatus according to Embodiment 1. The flowchart in FIG. 10 represents the creation procedure for a test-item table file. ST09 and ST10 are added to the flowchart in FIG. 2.

When a new test-item table file created by the test-item table file combining device 7 is stored in the new test-item table file storage device 8 (ST07), the test-item table file combining device 7 stores the new test-item table file in the previous test-item table file storage device 2, so that the original previous test-item table file is replaced by the new test-item table file (ST09). Furthermore, the screen data managing device 12 stores, in the previous screen data storage device 1, new screen information including a design change and a design addition set in the new screen data storage device 3; the original previous screen information is replaced by the new screen information (ST10). The foregoing method can omit the time and trouble for inputting data to the previous screen data storage device 1 and the previous test-item table file storage device 2 when a design change or a design addition occurs again in the screen.

Embodiment 3

Figure 11:
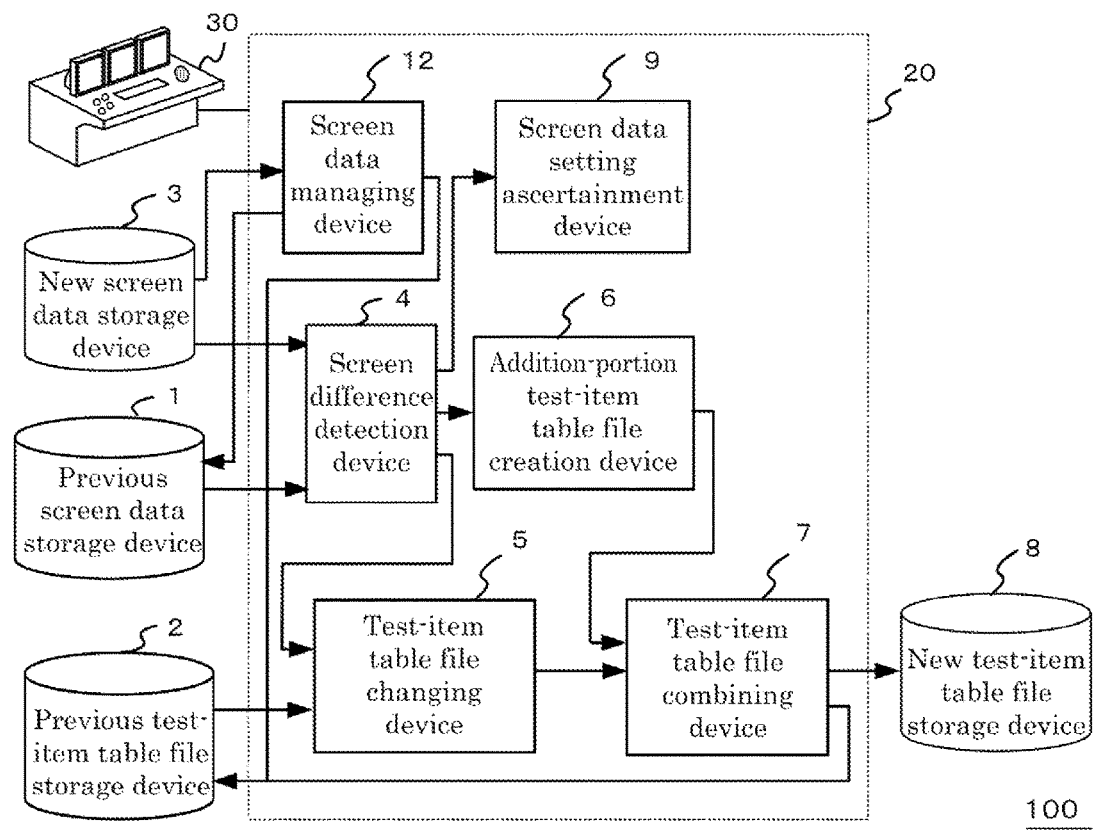
FIG. 11 is a diagram illustrating the configuration of a plant facilities testing apparatus according to Embodiment 3 of the present invention.

In Embodiment 1, it has been described that the screen difference detection device 4 extracts portions in a monitoring operation screen, in which a design change and a design addition are implemented and then the change and the addition are performed based on information in the previous test-item table file, so that the creation time is shortened. FIG. 11 is a diagram illustrating the configuration of a plant facilities testing apparatus according to Embodiment 3 of the present invention. In Embodiment 3, there is provided a screen data setting ascertainment device 9 that reads input data from the previous screen data storage device 1 and the new screen data storage device 3; when the respective screen numbers of a new screen and a previous screen (the respective sheet names of the data files) do not coincide with each other, the screen data setting ascertainment device 9 issues an error message. This method can prevent a human error that is caused when an input data file is set.

Figure 12:
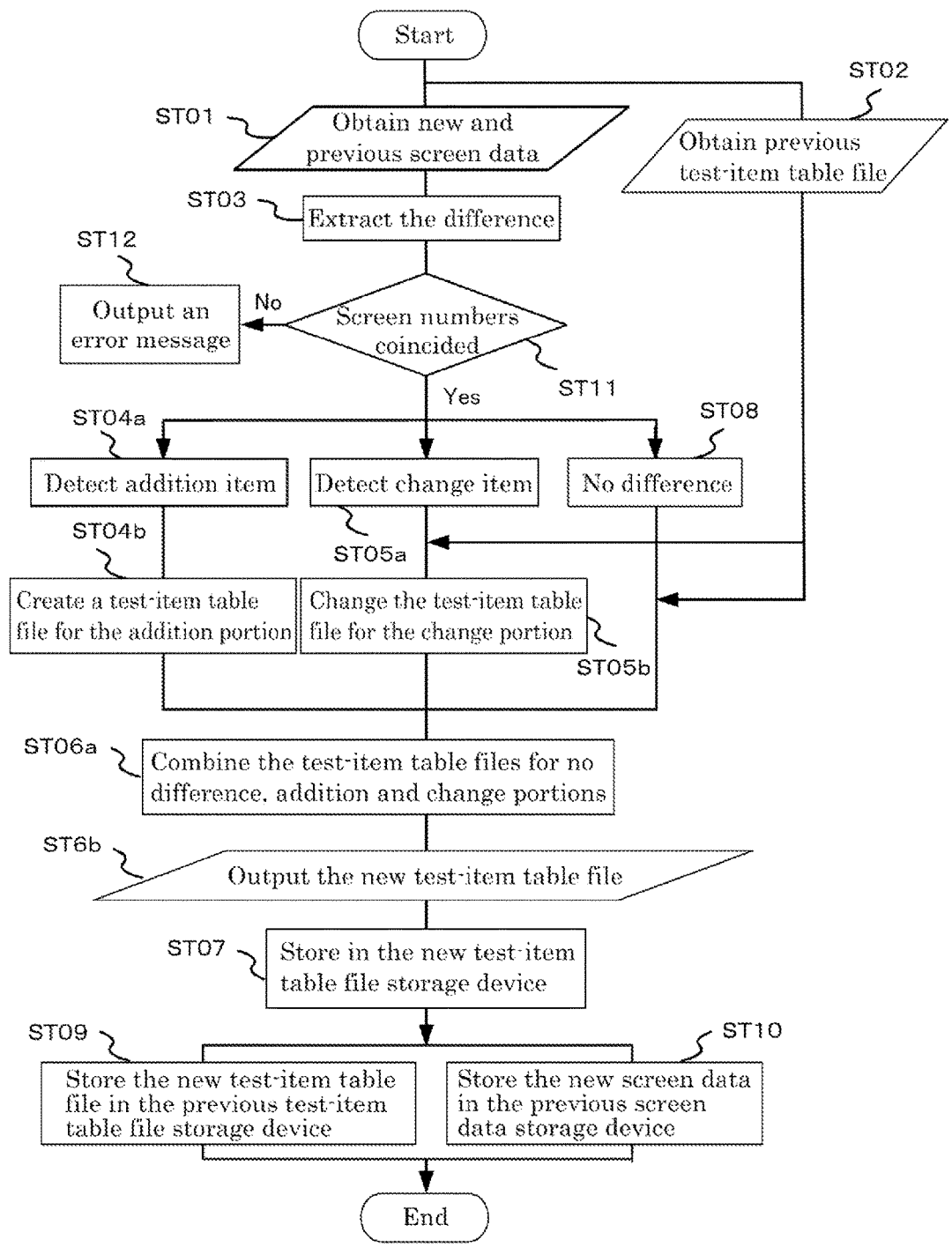
FIG. 12 is a chart representing the flow of creating a test-item table file according to Embodiment 3 of the present invention.

The flowchart in FIG. 12 represents the creation procedure for a test-item table file. After extracting the difference between the new screen and the previous screen (ST03), the screen data setting ascertainment device 9 determines whether or not the respective screen numbers (the respective sheet names of the data files) of the new screen and the previous screen coincide with each other (ST11). In the case where the respective screen numbers (the respective sheet names of the data files) of the new screen and the previous screen do not coincide with each other, the screen data setting ascertainment device 9 outputs an error message (ST12). In the case where the respective screen numbers (the respective sheet names of the data files) of the new screen and the previous screen coincide with each other, the step ST11 is followed by the next step.

The plant facilities testing apparatus 100 according to Embodiment 3 makes it possible to efficiently create a new test-item table file for a screen with a different assignment number or a screen created by adding information to a previous screen. Moreover, the plant facilities testing apparatus 100 makes it possible to realize maintenance work by a user, which is required in an oversea nuclear power plant, so that a customer can also readily secure the quality that is at a level the same as that of the factory.

Embodiment 4

Figure 13:
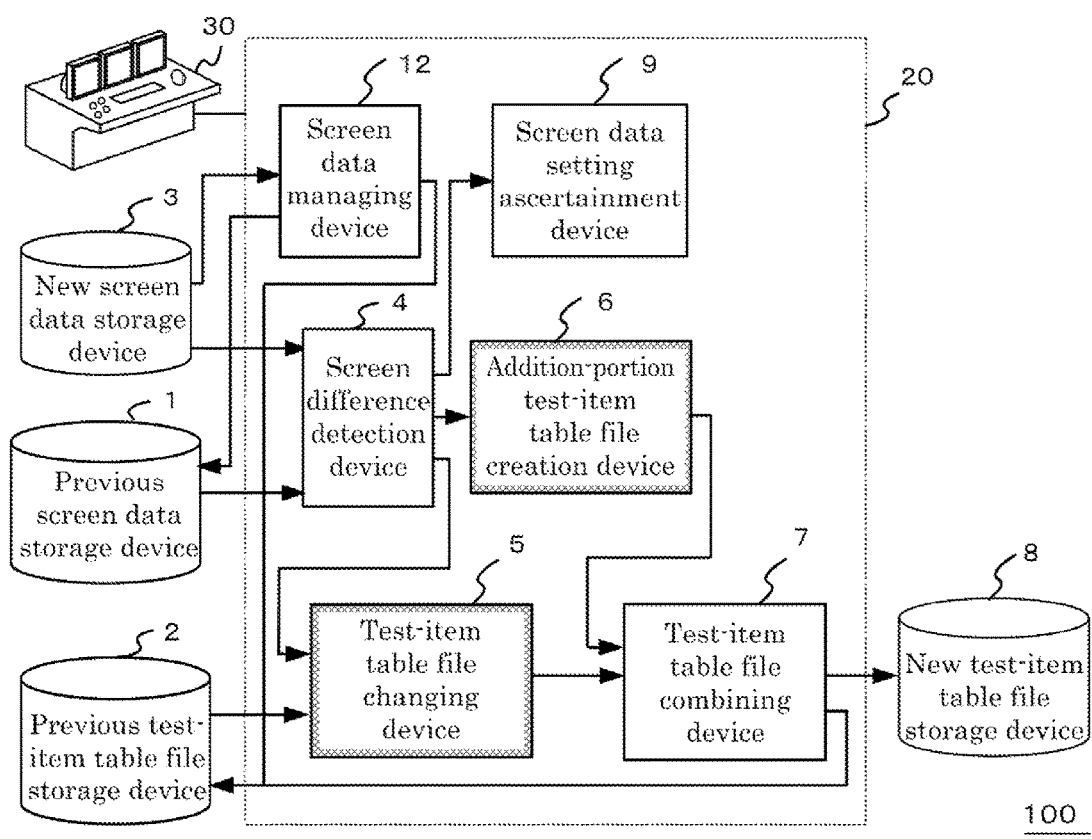
FIG. 13 is a diagram illustrating the configuration of a plant facilities testing apparatus according to Embodiment 4 of the present invention.

In Embodiment 1, it has been described that the screen difference detection device 4 extracts portions in a monitoring operation screen, in which a design change and a design addition are implemented and then the change and the addition are performed based on information in the previous test-item table file, so that the creation time is shortened. FIG. 13 is a diagram illustrating the configuration of a plant facilities testing apparatus according to Embodiment 4 of the present invention. In Embodiment 4, each of the test-item table file changing device 5 and the addition-portion test-item table file creation device 6 has a coloring function. Coloring the item number that has been changed from or added to the previous test-item table file makes it possible to readily detect the change portion and the addition portion. It may be allowed that instead of the coloring function, a light-and-shade display makes it possible to detect a change portion and an addition portion.

Figure 14:
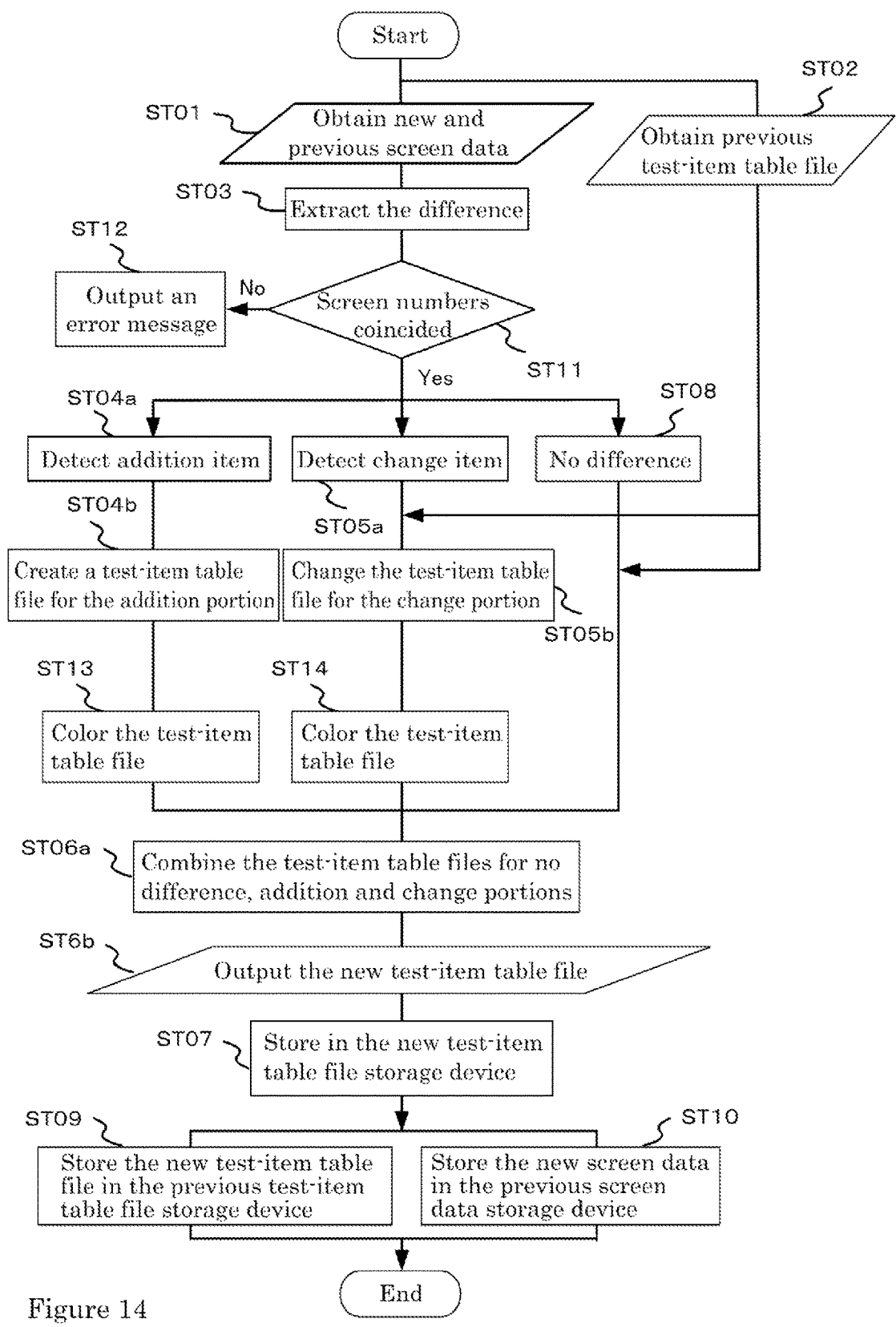
FIG. 14 is a chart representing the flow of creating a test-item table file according to Embodiment 4 of the present invention.

The flowchart in FIG. 14 represents the creation procedure for a test-item table file. In the case where an addition item is detected (ST04a), a test-item table file for the addition portion is created (ST04b); then, the test-item table file is colored (ST13). In the case where a change item is detected (ST05a), the change portion in a test-item table file is changed (ST05b); then, the test-item table file is colored (ST14).

FIG. 15 illustrates an example of monitoring operation screen, obtained by extracting part of a monitoring operation screen at a time after a design change has been applied to the pipe portion. On the screen, left-end four columns are colored. FIG. 16 illustrates an example of monitoring operation screen, obtained by extracting part of a monitoring operation screen at a time after a design addition has been applied to the pipe portion. On the screen, left-end four columns are colored (in practice, FIGS. 15 and 16 are not colored but greyed. These methods make it possible that a tester readily finds test items to which a design change and a design addition are applied.

The plant facilities testing apparatus 100 according to Embodiment 4 makes it possible to efficiently create a new test-item table file for a screen with a different assignment number or a screen created by adding information to a previous screen. Moreover, the plant facilities testing apparatus 100 makes it possible to realize maintenance work by a user, which is required in an oversea nuclear power plant, so that a customer can also readily secure the quality that is at a level the same as that of the factory.

Embodiment 5

Figure 17:
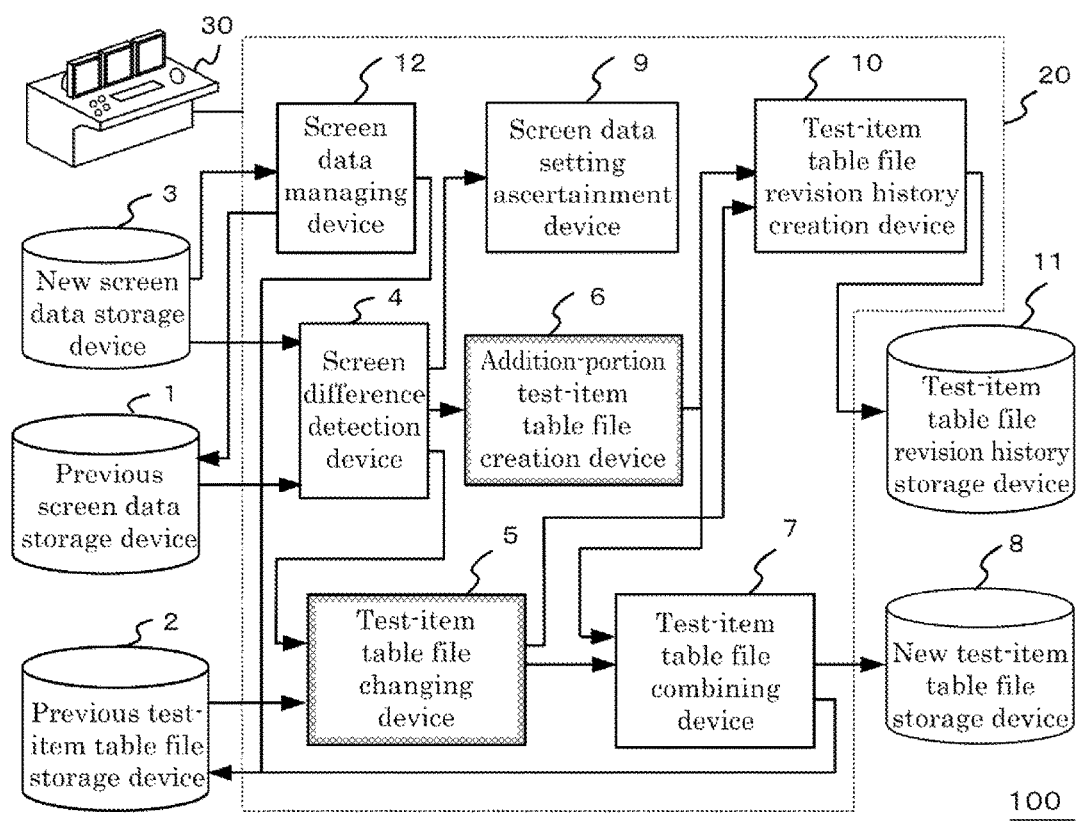
FIG. 17 is a diagram illustrating the configuration of a plant facilities testing apparatus according to Embodiment 5 of the present invention.

FIG. 17 is a diagram illustrating the configuration of a plant facilities testing apparatus according to Embodiment 5 of the present invention. The plant facilities testing apparatus 100 according to Embodiment 5 is provided with a test-item table file revision history creation device 10 and a test-item table file revision history storage device 11. The test-item table file revision history creation device 10 automatically creates a revision history in which a concerned screen number, a creation date and time, a change portion, an addition portion, and the like are listed and stores the created file in the test-item table file revision history storage device 11. These methods make it possible that a tester readily finds test items to which a design change and a design addition are applied.

Figure 18:
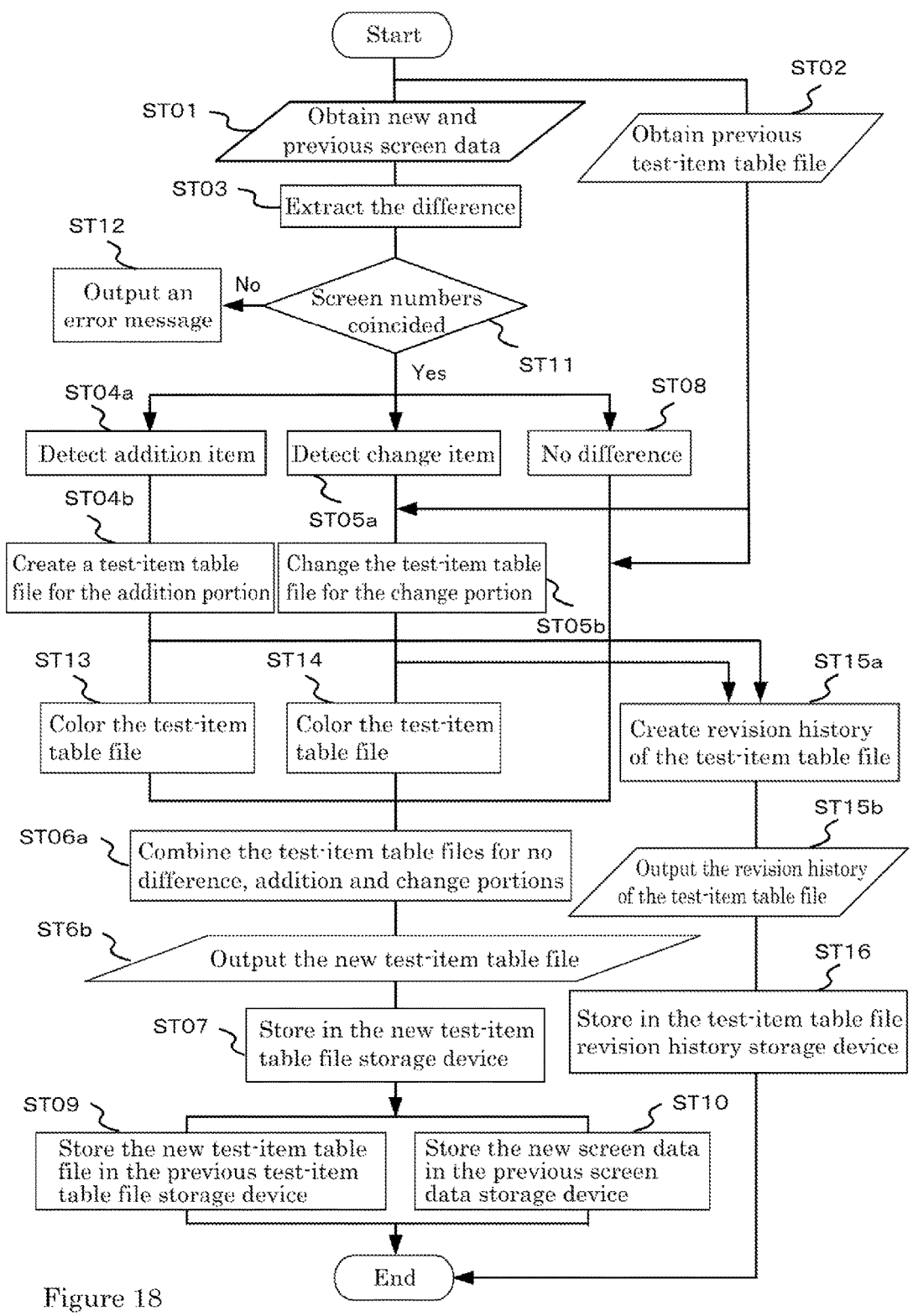
FIG. 18 is a chart representing the flow of creating a test-item table file according to Embodiment 5 of the present invention.

The flowchart in FIG. 18 represents the creation procedure for a test-item table file. In the case where an addition item is detected (ST04a), a test-item table file for the addition portion is created (ST04b); then, the test-item table file revision history (record) for the addition portion is created (ST15a). Similarly, in the case where a change item is detected (ST05a), the change portion in a test-item table file is changed (ST05b); then, the test-item table file revision history for the change portion is created (ST15a). The created test-item table file revision history (revision record) is outputted (ST15b) and then is stored in the test-item table file revision history storage device 11 (ST16).

The plant facilities testing apparatus 100 according to Embodiment 5 makes it possible to efficiently create a new test-item table file for a screen with a different assignment number or a screen created by adding information to a previous screen and to create a test-item table file revision history. Moreover, the plant facilities testing apparatus 100 makes it possible to realize maintenance work by a user, which is required in an oversea nuclear power plant, so that a customer can also readily secure the quality that is at a level the same as that of the factory.

In the scope of the present invention, the embodiments thereof can freely be combined with one another and can appropriately be modified or omitted.

INDUSTRIAL APPLICABILITY

The present invention relates to an apparatus that automatically creates a test-item table file to be utilized in testing a GUI (Graphic User Interface) control program in a monitoring operation screen for a power station.

DESCRIPTION OF REFERENCE NUMERALS

1: previous screen data storage device
2: previous test-item table file storage device
3: new screen data storage device
4: screen difference detection device
5: test-item table file changing device
6: addition-portion test-item table file creation device
7: test-item table file combining device
8: new test-item table file storage device
9: screen data setting ascertainment device
10: test-item table file revision history creation device
11: test-item table file revision history storage device
12: screen data managing device
20: control unit
30: display device
100: plant facilities testing apparatus

The invention claimed is:

1. A plant facilities testing apparatus comprising:
a display device that displays a monitoring operation screen for plant facilities installed in a power station;
a first table file storage device that stores an unupdated test-item table file for the plant facilities;
a second table file storage device that stores an updated test-item table file for the plant facilities;
a first screen data storage device that stores unupdated screen information on a monitoring operation screen to be displayed by the display device, wherein the unupdated screen information corresponds to a first set of a plurality of display items;
a second screen data storage device that stores updated screen information on a monitoring operation screen to be displayed by the display device, wherein the updated screen information corresponds to a second set of a plurality of display items; and
a control unit that controls the first table file storage device, the second table file storage device, the first screen data storage device, and the second screen data storage device, wherein when update of the test-item table file is started, the control unit implements:
a first step of obtaining the unupdated screen information and the updated screen information from the first screen data storage device and the second screen data storage device, respectively;
a second step of obtaining the unupdated test-item table file from the first table file storage device;
a third step of comparing the unupdated screen information and the updated screen information that have been obtained in the first step and extracting a change item and an addition item while categorizing a difference thereinto;
a fourth step of creating a test-item table file for an addition portion, based on the addition item extracted in the third step;
a fifth step of creating a test-item table file for a change portion, based on the change item extracted in the third step and the unupdated test-item table file obtained in the second step;
a sixth step of creating an updated test-item table file by combining the test-item table file for an addition portion created in the fourth step with the test-item table file for a change portion created in the fifth step, wherein the updated test-item table file includes table data for the unupdated screen information corresponding to one of the display items from the first set of display items;
a seventh step of storing the updated test-item table file created in the sixth step in the second table file storage device; and
using the updated test-item table file to test accuracy of a control program that monitors and controls the plant facilities.

2. The plant facilities testing apparatus according to claim 1, wherein after comparing the unupdated screen information with the updated screen information in the third step so as to extract the difference therebetween and when determining that the unupdated screen information is the same as the updated screen information, the control unit implements a step of transferring the unupdated test-item table file obtained in the second step to the sixth step.

3. The plant facilities testing apparatus according to claim 1, wherein the control unit implements:
a step of replacing the unupdated test-item table file stored in the first table file storage device by the updated test-item table file created in the sixth step; and
a step of replacing the unupdated screen information stored in the second screen data storage device by the updated screen information obtained in the first step.

4. The plant facilities testing apparatus according to claim 1,
wherein the control unit implements:
a step of determining whether or not respective screen numbers of the unupdated screen information and the updated screen information that have been obtained in the first step coincide with each other; and
a step of outputting an error message when it is determined that the respective screen numbers are different from each other.

5. The plant facilities testing apparatus according to claim 1,
wherein the control unit implements:
a step of coloring and then displaying the test-item table file for an addition portion created in the fourth step; and
a step of coloring and then displaying the test-item table file for a change portion created in the fifth step.

6. The plant facilities testing apparatus according to claim 1, further including a third table file storage device that stores a revision history of the test-item table file,
wherein the control unit implements:
a step of creating a revision history of the test-item table file for an addition portion created in the fourth step and a revision history of the test-item table file for a change portion created in the fifth step; and
a step of storing in the third table file storage device the revision history of the test-item table file for an addition portion and the revision history of the test-item table file for a change portion.

7. The plant facilities testing apparatus according to claim 2,
wherein the control unit implements:
a step of replacing the unupdated test-item table file stored in the first table file storage device by the updated test-item table file created in the sixth step; and
a step of replacing the unupdated screen information stored in the second screen data storage device by the updated screen information obtained in the first step.

8. The plant facilities testing apparatus according to claim 2,
wherein the control unit implements:
a step of determining whether or not respective screen numbers of the unupdated screen information and the updated screen information that have been obtained in the first step coincide with each other; and
a step of outputting an error message when it is determined that the respective screen numbers are different from each other.

9. The plant facilities testing apparatus according to claim 3,
wherein the control unit implements:
a step of determining whether or not respective screen numbers of the unupdated screen information and the updated screen information that have been obtained in the first step coincide with each other; and
a step of outputting an error message when it is determined that the respective screen numbers are different from each other.

10. The plant facilities testing apparatus according to claim 2,
wherein the control unit implements:
a step of coloring and then displaying the test-item table file for an addition portion created in the fourth step; and
a step of coloring and then displaying the test-item table file for a change portion created in the fifth step.

11. The plant facilities testing apparatus according to claim 3,
wherein the control unit implements:
a step of coloring and then displaying the test-item table file for an addition portion created in the fourth step; and
a step of coloring and then displaying the test-item table file for a change portion created in the fifth step.

12. The plant facilities testing apparatus according to claim 4,
wherein the control unit implements:
a step of coloring and then displaying the test-item table file for an addition portion created in the fourth step; and
a step of coloring and then displaying the test-item table file for a change portion created in the fifth step.

13. The plant facilities testing apparatus according to claim 2, further including a third table file storage device that stores a revision history of the test-item table file,
wherein the control unit implements:
a step of creating a revision history of the test-item table file for an addition portion created in the fourth step and a revision history of the test-item table file for a change portion created in the fifth step; and
a step of storing in the third table file storage device the revision history of the test-item table file for an addition portion and the revision history of the test-item table file for a change portion.

14. The plant facilities testing apparatus according to claim 3, further including a third table file storage device that stores a revision history of the test-item table file,
wherein the control unit implements:
a step of creating a revision history of the test-item table file for an addition portion created in the fourth step and a revision history of the test-item table file for a change portion created in the fifth step; and
a step of storing in the third table file storage device the revision history of the test-item table file for an addition portion and the revision history of the test-item table file for a change portion.

15. The plant facilities testing apparatus according to claim 4, further including a third table file storage device that stores a revision history of the test-item table file,
wherein the control unit implements:
a step of creating a revision history of the test-item table file for an addition portion created in the fourth step and a revision history of the test-item table file for a change portion created in the fifth step; and
a step of storing in the third table file storage device the revision history of the test-item table file for an addition portion and the revision history of the test-item table file for a change portion.

16. The plant facilities testing apparatus according to claim 5, further including a third table file storage device that stores a revision history of the test-item table file, wherein the control unit implements:
- a step of creating a revision history of the test-item table file for an addition portion created in the fourth step and a revision history of the test-item table file for a change portion created in the fifth step; and
- a step of storing in the third table file storage device the revision history of the test-item table file for an addition portion and the revision history of the test-item table file for a change portion.

17. The plant facilities testing apparatus according to claim 1, wherein:
- the addition portion corresponds to at least one first display item,
- the change portion corresponds to at least one second display item, and
- the one or more display items corresponding to the unupdated screen information are different from the at least one first display item and from the at least one second display item.

* * * * *